United States Patent [19]

Drefchinski

[11] Patent Number: 4,557,576
[45] Date of Patent: Dec. 10, 1985

[54] ANTI-CREEP ATTACHMENT FOR ZOOM LENS OF A CAMERA

[76] Inventor: Robert M. Drefchinski, P.O. Box 97, E. Moline, Ill. 61244

[21] Appl. No.: 618,807

[22] Filed: Jun. 8, 1984

[51] Int. Cl.⁴ ............................................. G03B 17/00
[52] U.S. Cl. ............................... 354/295; 354/195.12; 350/245; 350/255; 350/257
[58] Field of Search ............... 354/195.1, 195.12, 293, 354/295, 286; 350/245, 251, 252, 255, 257

[56] References Cited

U.S. PATENT DOCUMENTS

| 2,523,067 | 9/1950 | Sherry | 354/195.12 |
| 3,511,159 | 5/1970 | Hobbs | 354/293 |
| 4,027,318 | 5/1977 | Knapp | 354/293 |
| 4,330,176 | 5/1982 | Kawai | 350/255 |

FOREIGN PATENT DOCUMENTS 620924 8/1978 U.S.S.R. ................. 350/78

Primary Examiner—A. A. Mathews
Attorney, Agent, or Firm—Henderson & Sturm

[57] ABSTRACT

The present invention offers a solution to the undesirable creep or movement of the movable part of a camera zoom lens after it has been adjusted as to focus and/or focal length but before the picture has been taken, resulting usually because the heavy lens part moves axially when the camera is tilted during activities intervening between setting of the lens and snapping the shutter. The device comprises a base attachable to a fixed part of the camera and a tongue attached to the base and adapted to engage the movable part of the lens. The tongue and the movable lens part are provided with interengageable material such as Velcro for effecting a temporary connection between the tongue and the adjusted lens part. The tongue is hinged to the base for swinging toward and away from the movable lens part so as to achieve connection and disconnection of the Velcro-equipped parts. In one form of the invention, the base is attachable to the camera body. In another form, the base has a clamp part adapted to frictionally grasp the fixed lens part.

10 Claims, 4 Drawing Figures

ANTI-CREEP ATTACHMENT FOR ZOOM LENS OF A CAMERA

TECHNICAL FIELD

The present invention relates to an attachment for a camera and more particularly to a simple attachment for preventing creep of the movable part of some zoom lens such as occurs as a result of tilting of the camera after the lens has been set as to focus and/or focal length but prior to snapping of the shutter. Because of the relatively heavy weight of the lens part, axial creep follows even the slightest movement of the camera from a level position unless extreme care is taken to hold the lens position by grasping it with the hand, and almost impossible manipulation to perform along with other maneuvers incident to the taking of quality photographs, or by taping the lens in place, which is inconvenient and unreliable.

According to the invention, a simple attachment is provided, comprising relatively few parts and inexpensively constructed so as to result in an efficient, long-lived and low-cost item. In either form of the two modifications chosen for purposes of the present disclosure, the attachment comprises a base having means for the attachment thereof to a fixed part of the camera, in one case the camer body and in the other instance the fixed part of the lens that is itself fixed to the camera body. The base has a tongue connected thereto which is adapted to extend lengthwise along the total length of the lens so as to be available regardless of the focal length at which the lens is set. The tongue is equipped with means for selectively engaging and being disengaged from a compatible means on the movable lens part, Velcro or its equivalent being preferred for this purpose. The tongue is hinged or otherwise associated with the base so as to be movable toward and away from the movable lens part in a direction transverse to the axis of the lens for the purpose of connecting and disconnecting the Velcro during fixing and releasing of the movable lens portion.

In one form of the invention, a simple means for affixing the attachment base to the camera comprises a screw or the like passed through the base and adapted to be threaded into the usual tapped bore provided in the camera body for receiving the screw of a tripod or the like. In many cases, it is possible to use a typical screw which has a tapped bore for receiving the screw of a tripod or the like.

In another form of the invention, the base has a yoke or similar clamp-type element adapted to frictionally grasp the fixed part of the lens. In either case, the parts are formed of appropriate material, preferably lightweight metal such as aluminum, soft steel or a combination of the two; although, a wide variety of materials may be resorted to.

Features and advantages other than those noted above will become apparent to those versed in the art as preferred embodiments of the invention are disclosed in the ensuing description and accompanying sheet of drawings.

DETAILED DESCRIPTION OF PREFERRED EMBODIMENTS

FIGS. 1-3

Figure 1:
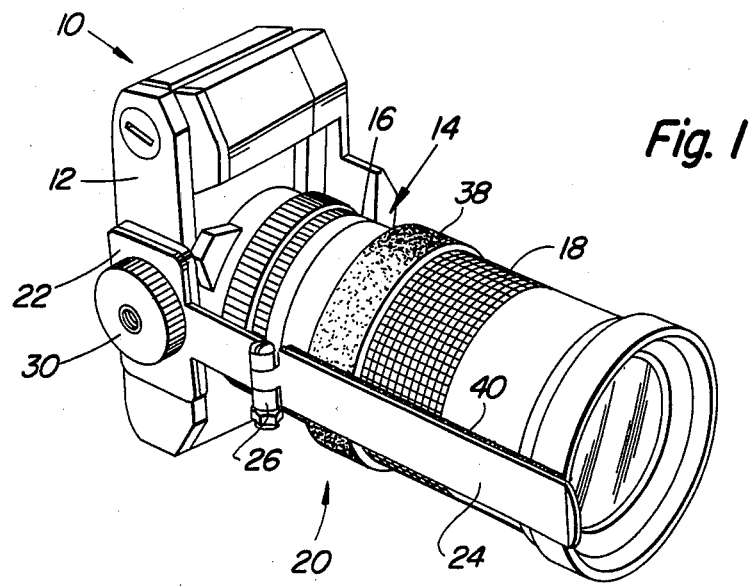
FIG. 1 is a perspective showing one form of attachment mounted on a representative camera.
Figure 2:
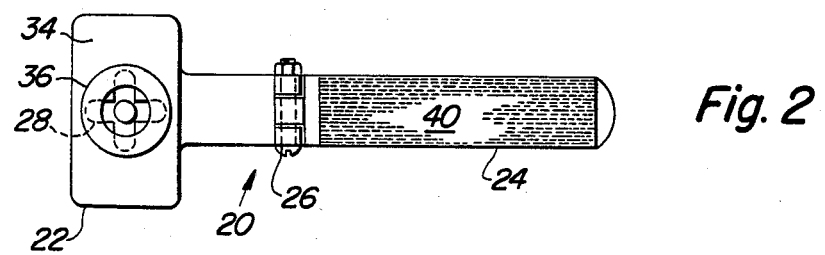
FIG. 2 is a plan view of the attachment per se.

FIG. 1 shows at (10) a typical camera having a body element (12) and a zoom lens (14). The lens includes a fixed element (16) affixed to the body in the usual manner and a movable lens part (18). This structure is representative and as such forms no part of the invention.

Figure 3:
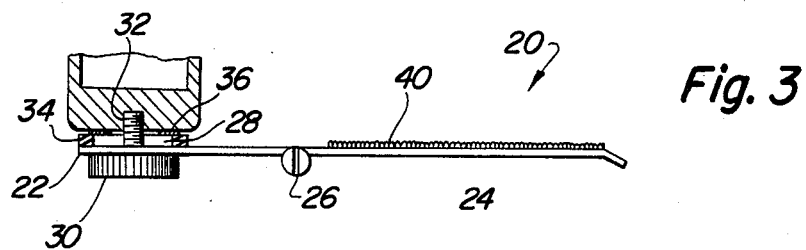
FIG. 3 is an elevation of the structure shown in FIGS. 1 and 2, with an associated camera portion shown in section.
Figure 4:
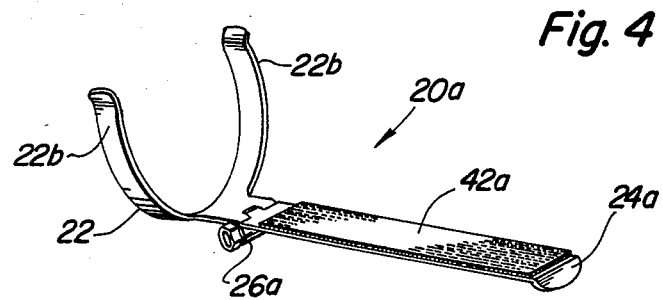
FIG. 4 is a perspective of another form of the invention apart from a camera.

The anti-creep attachment is designated in its entirety by the numeral (20) and comprises a base (22) and a tongue (24), the latter being preferably hinged at (26) to the former on an axis transverse to the length of the tongue. The base is generally in the shape of a T and has its wider part formed with a cruciform slot (28) through which is passed the threaded portion of a headed screw member (30). As shown in FIG. 3, the camera body is typically provided with a tapped bore (32) for receiving a tripod screw (not shown). In the absence of such tripod the screw member (30) is threaded into this bore, preferably passing first through a pad (34) and a retainer (36), here in the form of a disk of transparent material of a thickness about equal to the pitch of the threads on the screw member so as to be capable of being quickly threaded onto the screw member to retain the screw member when the attachment is detached from the camera. The pad, of course, has a cruciform slot matching the slot (28). The purpose of this slot is to allow for limited adjustment of the attachment relative to the camera body to accommodate differences in location of the tripod-mounting bore (32).

The tongue is sufficiently elongated to span the length of the zoom lens when fully extended so as to accommodate itself to various axial positions of the movable lens part on the fixed lens element, it being understood that changes in position or focal length are accomplished manually by the user while sighting in on the object to be photographed. The movable lens part is typically relatively heavy and, unless restrained in some fashion, has a tendency to creep out of selected position if the camera is tilted, etc., during the photographing preparations.

According to the present invention, however, the anti-creep attachment eliminates this problem. To this end, the movable lens part is provided with engageable means or material, here in the form of a band or ring (38) of hook and loop material such as Velcro or its equivalent. A band is used here in order to provide the Velcro material completely around the lens part to accommodate different angular positions of the lens part. Complementary engageable means is provided on the tongue (24), again in the form of a strip (40) of Velcro or its equivalent. The band and strip may be applied to the lens and tongue by means of any suitable adhesive. As will be clear, when the attachment is in place and the tongue pressed towards the lens, the cooperative Velcro portions will connect or "adhere". It is in this area that the hinge (26) becomes significant, for it allows the tongue to be swung clear of the lens during adjustment of the lens. When the desired position is achieved, the user swings the tongue easily back to the lens, as by a finger of the hand holding the lens, and thus interengages the band and strip of Velcro material. The Velcro portions may, of course, be readily disengaged when not in use. As noted above, the screw member (30) may be of the type having a tapped bore (42) for the purpose of receiving the threaded stud of a tripod or the like.

FIG. 4

This form of the invention has all the attributes of that described above except for the manner of attaching same to the camera. This attachment, designated in its entirety at (20a), has a base (22a) and a tongue (24a) hinged to the base at (26a) and furnished with a Velcro entirety at (20a), has a base (22a) and a tongue (24a) hinged to the base at (26a) and furnished with a Velcro strip (40a). The base here is in the form of a U-shaped clamp element of aluminum steel or other suitable material having opposed legs (22b) adapted to frictionally engage the cylindrical fixed lens element, preferably just ahead of but abutting the usual knurled ring on the lens by means of which the lens assembly is screwed onto and unscrewed from the camera. The combination of the base abutting the lens ring and the friction grip of the legs (22b) on the fixed lens part serve to mount the attachment quite fixedly, yet removably, on the camera. The hinged, Velcro-equipped tongue is used as before in conjunction with the Velcro ring on the movable lens.

It will be understood from the foregoing that only two preferred embodiments have been selected to illustrate and describe the invention. However, many other forms may be resorted to and many changes made in those forms disclosed, all without departure from the spirit and scope of the invention.

I claim:

1. For use with a camera having a body element and a two-part zoom lens assembly including a body-affixed lens element and a movable lens part axially positionable along the body-affixed element: an anti-creep attachment for the camera for releasably retaining a selected position of axial adjustment of the movable lens part, comprising first engageable means affixed to the movable lens part, a base including means for the affixation thereof to one of the elements, a tongue extending from the base for disposition closely alongside the movable lens part and in close proximity to the first engageable means, second engageable means on the tongue and releasably cooperative with the first engageable means, and means mounting the tongue on the base for selective manual movement of the tongue radially toward and away from the movable lens part for respectively engaging and disengaging the first and second engageable means.

2. The invention according to claim 1, in which the affixation means on the base is cooperative with the body element.

3. The invention according to claim 2, in which the body element includes a tapped bore and the affixation means on the base includes a screw receivable by the bore.

4. The invention according to claim 3, in which the screw includes a headed portion in turn having a tapped bore for receiving a tripod screw or the like.

5. The invention according to claim 1, in which the affixation means on the base is cooperative with the fixed lens element.

6. The invention according to claim 5, in which the affixation means is constructed to at least partly embrace the fixed lens element.

7. The invention according to claim 6, in which said means is a clamp device frictionally engaging the fixed lens element.

8. The invention according to claim 1 in which the first and second engageable means comprise pressure sensitive portions respectively on the tongue and movable lens part.

9. The invention according to claim 1, in which the first and second engageable means comprises cooperative portions of Velcro secured respectively to the movable lens part and to the tongue.

10. The invention according to claim 1, in which the means mounting the tongue on the base includes a hinge enabling swinging of the tongue relative to the base toward and away from the movable lens part.

* * * * *